Jan. 23, 1951     A. HALPIN     2,538,778
PET CARRIER
Filed Oct. 30, 1945
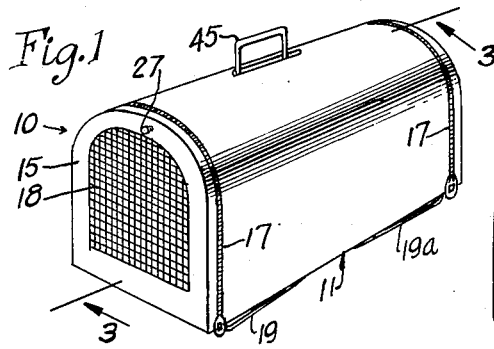
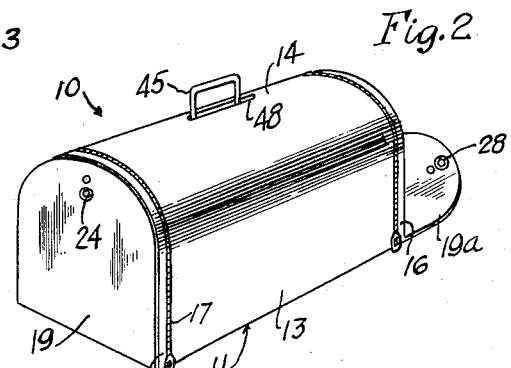
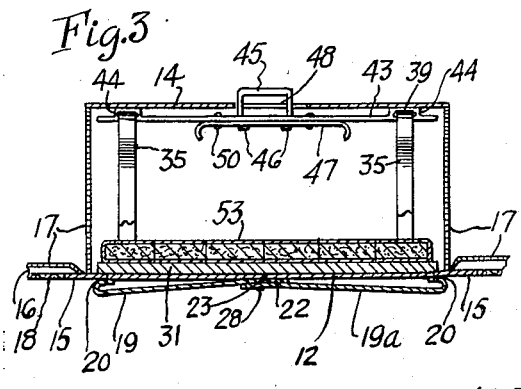
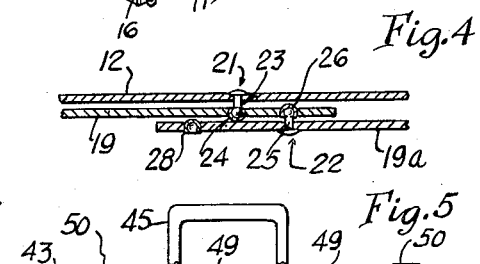
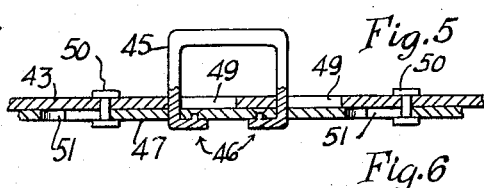
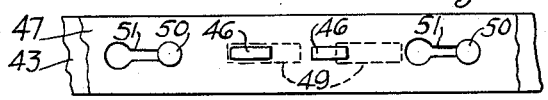
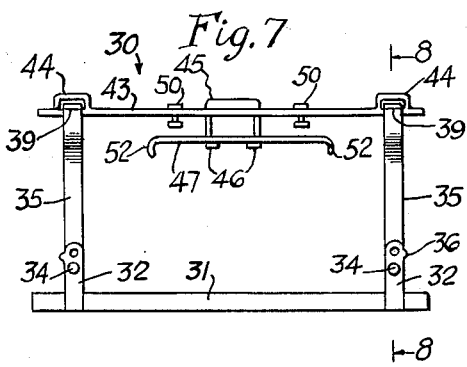
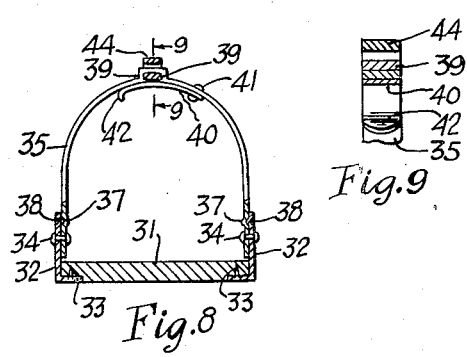
INVENTOR.
Abraham Halpin Patented Jan. 23, 1951

2,538,778

UNITED STATES PATENT OFFICE 2,538,778

PET CARRIER

Abraham Halpin, New York, N. Y.

Application October 30, 1945, Serial No. 625,471

7 Claims. (Cl. 119—19)

This invention relates to portable receptacles, for example of the collapsible type, and has particular reference to receptacles of the type adapted to serve as pet carriers.

One object of the invention is to provide a receptacle of the character described having improved means to facilitate its use as a pet carrier wherein an animal may be safely and comfortably housed with openings for light and ventilation, and in which the light may be conveniently cut off at night time according to the practice commonly employed with birds and the like.

Another object of the invention is to furnish a device of the nature set forth wherein a container is provided with a removable stiffening frame that is easily removable to permit convenient cleansing of the frame and of the container particularly if the device is employed as a pet carrier.

Another object of the invention is to construct a portable receptacle of a collapsible nature, comprising a carrying handle and a stiffening frame, with improved means so that the handle is movably attached to the frame for removal of the latter without obstruction by the container wall.

Another object of the invention is the provision of a portable receptacle of the class alluded to wherein a container of pliable material is associated with a novel collapsible stiffening frame therefor.

A further object of the invention is to furnish a device of the nature set forth having improved means for movably mounting a handle on a portable receptacle so that the handle is movable inwardly of the container in an out of way or concealed position or for other purposes and is movable outwardly to serve as a carrier for the receptacle, with the handle being releasibly locked to maintain it in its outward position.

Still another object of the invention is to provide an improved structure of a simple, compact and relatively inexpensive nature, which is durable and efficient in use, for accomplishing the various objects and purposes herein pointed out.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a perspective view showing a portable receptacle in the nature of a pet carrier embodying the invention and arranged to permit access of light and air thereinto.

Fig. 2 is a similar view also showing certain flaps for cutting off access of light into the receptacle, one of these flaps being in open position.

Fig. 3 is a fragmentary longitudinal sectional view of the portable receptacle in open position taken on lines 3—3.

Fig. 4 is an enlarged fragmentary sectional view showing details for connecting the end flaps in inoperative position at the bottom of the receptacle.

Fig. 5 is an enlarged fragmentary sectional view of the handle and the means for movably mounting the same.

Fig. 6 is a bottom plan view of Fig. 5.

Fig. 7 is a somewhat enlarged view in side elevation of the collapsible frame in expanded position, removed from the container section, and with the handle being in dropped position.

Fig. 8 is a sectional view taken on line 8—8 of Fig. 7.

Fig. 9 is an enlarged sectional view taken on line 9—9 of Fig. 8.

Fig. 10 is a side view of the frame in collapsed position.

The advantages of the invention as here outlined are best realized when all of its features and instrumentalities are combined, but useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Referring in detail to the drawing 10 denotes a portable receptacle embodying the invention. The same may include an outer container 11 of a pliable or flexible material which may be canvas, leather or composition fabric, and is preferably of a water-proof nature. This container includes a bottom portion 12, side walls 13 and a top wall 14, but it may be of any suitable size and shape. One or both ends of this container may be opened, and preferably such openings extend over the full area of the container. Provided for each end opening are closure members 15 hingedly or foldably connected to the bottom wall 12. Each of these closure members may have a marginal flange 16 connected to the main body of the container 11 by any suitable detachable fasteners such as slide fasteners 17. As thus far described it will be apparent that the container 11 may constitute a case for luggage or other articles and it will be clear that as a luggage case the container 11 may be arranged to open in any suitable manner well known in the art. For use as a pet carrier, the members 15 are provided with perforated elements or wire screens 18 connected thereto in any feasible manner and serving to admit light and air into the container. To cut off the admission of light into the container flaps 18 and 19a are foldably or hingedly connected to the bottom wall 12 as at 20. When not in use, these flaps are adapted to fold toward each other sufficiently to overlap each other as clearly shown in Figs. 3 and 4. For securing them in position, any detachable fastening means may be employed such as snap fasteners 21 and 22. The former includes a male member 23 affixed to the bottom wall 12 and a female member 24 affixed to one of the flaps 19. The fastener 22 includes a male member 25 affixed to the flap 19a and a female member 26 secured to the flap 19. Thus the flap 19 is first secured at 21 and then the flap 19a is secured at 22. When the flaps are folded upward to overlie the doors 15 as shown in Fig. 2 the female member 26 is engaged with a male member 27 on the adjacent door 15. For similarly securing the flap 19a the latter may have a female member 28 engageable with a male member 27 on the door adjacent thereto. When the flaps 19 and 19a are thus secured in overlying relation to the doors 15, if the slide fasteners 17 are opened, the door and its cooperating flap may be opened and closed as a unit. When the door is thrown open into a horizontal position as shown in Fig. 3 an animal may walk into or out of the container 11.

For maintaining the collapsible container 10 in expanded position the same may be provided with a frame 30 which is desirably collapsible for compactness to the position shown in Fig. 10. As hereinafter apparent this frame is removable but it may also be permanently affixed to the container 11 and collapsed therein; but for certain purposes it is preferred that the frame be removable to facilitate cleaning of the receptacle. The frame 30 may comprise a plate 31 consisting of composition material, metal, wood or fiber board and is almost coextensive with the bottom wall 12. Affixed to the base 31 is a plurality of relatively short arms or standards 32, which may be in the nature of angle members set into the base 31 and affixed thereto with the aid of projections or screws 33. These arms 32 form opposed pairs that are in parallel relation to each other. Located between the arms of each pair and pivotally mounted thereon at 34 is a frame member 35 which may be of inverted U-shaped form adapted to conform to the expanded container 11. The frame members 35 are freely swingable toward each other as indicated in Fig. 10 and are prevented from pivoting away from each other by stop lugs 36 formed on the arms 32. To maintain the frame members 35 in upright position a releasable snap spring engagement may be provided adjacent to each pivot 34. This may include a spring, and for simplicity, spring action may be furnished by the member 35 itself, the same having depressions 37 to receive the teats 38 formed on the arms 32. The arrangement is such that the parts 34, 37 and 38 form spring hinges which are automatically engaged when the members 35 are swung into vertical position and are disengaged by forcing these members downwardly and toward each other. At their upper portions, the members 35 may be formed with inverted U-shaped portions 39 in central relation thereto, and underlying these portions are strip springs 40 secured to the frame members 35 at 41 and shaped to conform to the latter, these springs also having downwardly bent entrance lips 42. Movably mounted on the frame members 35 is a bar 43 having ears 44 for slidably receiving the members 35. These ears are of sufficient size to pass the hinge structure for the members 35, but otherwise relatively snugly engage these members so as to avoid rattling or the like. In the collapsed position, the bar 43 is moved downwardly along the frame members 35 and past the hinges so as to lie upon the base at a side thereof as shown in Fig. 10. In operative position, the bar 43 lies at the top of the frame members 35 and is engaged in the offsets 39, being held thereon by the springs 40. The bar 43 is movable into this position by engaging the lips 42 as the bar moves upwardly, thus deflecting its springs 40 downwardly. Accordingly, in the fully expanded position of the frame the bar 43 serves as a positive lock to prevent accidental movement of the frame members 35 toward each other into collapsed position. Accordingly the resilient engaging portions at 37 and 38 may be omitted.

Mounted on the bar 43 is a handle 45 adapted to extend through a slot 48 in the container 11. Preferably this handle is hingedly or slidably mounted on the bar 43 so that it may be readily depressed or swung aside to facilitate its disengagement from the slot 48 and thus to permit removal of the frame 30 from the container 11. Preferably the handle is mounted so as to be movable inwardly and outwardly of the container 11 by an upright movement so that it may be positioned out of the way or concealed within the container, these functions having particular utility when the portable receptacle is to be used as a luggage case or is to be collapsed into a highly compact position. Hence the handle 45 which is of generally inverted U-shaped form is affixed in any suitable manner at 46 to a bar or plate 47 that underlies the bar 43, with the arms of the handle passing through the openings or slots 49 in the bar 43.

For certain purposes, as in the event that the portable receptacle is used as a pet carrier, it is desirable that the handle shall be locked in its outward extending position so that it may not occupy space within the receptacle and annoy the animal contained therein. Preferably the locking engagement is one which is operative directly by manipulation of the handle 45. Accordingly another path of movement is provided for the handle as by making the opening 48 in the form of a slot longer than the handle. In the bar 43 there are provided slots 49 for the different arms of the handle. Secured to the bar 43 are headed pins 50 which depend therefrom for engagement in the key hole slots 51 formed in the bar 47. The arrangement is such that the handle 45 may be grasped and pulled upwardly to enter the pins 50 in the key hole slots after which the handle is moved in a horizontal direction with a corresponding movement of the bar 47, causing the same to be locked by the pins 50 against the bar 43. In a sense it will be seen that the bar 47 constitutes an enlarged anchor head permanently affixing the handle to the bar 43. If it be desired to depress the handle 45, it is moved horizontally in an opposite direction so that the bar 47 disengages the pins 50 whereupon the handle may drop inwardly. The bar 47 may also be manipulated from within the portable receptacle, for which purpose this bar may have downwardly bent finger piece portions 52 to permit is to be easily manipulated.

The manner of using the invention will now be briefly described. As already pointed out the portable receptacle may be used as a luggage case or as an animal carrier subject to minor changes in construction. If used as an animal carrier a cushion 53 may be placed therein on the base board 31. The animal is received in the receptacle and the doors 15 closed by means of the zipper 17 permitting light and air to freely enter through the screens 18, while the flaps 19 are folded under the bottom and secured neatly in an out of the way position. If it be desired to cut off access of light to the receptacle the flaps may be folded upwardly and secured to overlie the doors 15. When thus positioned the doors 15 and their flaps may be opened and closed as units by operation of the snap fasteners 17. If the portable receptacle is not in use it may be collapsed into a compact position or it may be otherwise manipulated to facilitate cleansing. The collapsing operation may be accomplished while the frame is in the receptacle container 11, or the frame may be first removed therefrom. In either case the handle 45 is moved horizontal to unlock it and is then dropped to the position of Fig. 7 to disengage it from the slot 48. Now the bar 43 may be moved laterally and downwardly along the frame members 35 and out of tht springs 40, to permit the bar 43 to lie below the hinges 34 as shown in Fig. 10. The frame members 35 may be then moved toward each other to thus fully collapse the frame. In this position it will be noted that the handle does not form an obstruction against the side wall of the container 11. When thus collapsed the flaps preferably lie underneath the container together with the doors 15, or the latter may be moved inwardly into the container as preferred. To expand the portable receptacle for use, if the frame has been removed therefrom, it is readily inserted into the container 11 through one of the end portions thereof. The bar 43 is moved upwardly over the springs 42 and into engagement with the offsets 39, after the frame members 35 have been swung upwardly. Then the handle 45 is manipulated to lock it in its outwardly projecting position.

I claim:

1. A portable, collapsible carrier for animals, including a receptacle of pliant material having an end opening, a frame removably fitted in the receptacle through said end opening to maintain the receptacle expanded, the receptacle having a perforated portion for admitting light and air and having a closure door for the end opening, a movable handle for the frame, the receptacle having an opening through which the handle is adapted to protrude, and means movably connecting the handle to the frame for movement of the latter to protruding position and to retracted position in the receptacle, the frame being removable without obstruction by the handle when the latter is in the retracted position, and said means being adapted to normally maintain the handle in its protruding position to avoid interference thereof with an animal in the receptacle.

2. A portable receptacle including a collapsible container of pliable material, a base member therein, a pair of inverted U-shaped frame elements, means on the base member pivotally mounting the frame elements at points spaced above the base member, said frame members being swingable downwardly into collapsed position, and means for releasably maintaining the frame members upright to thus maintain the container expanded, including a bar engaged with the frame members and slidable therealong to a first position below the hinge connections to permit the swinging movement of the frame members, and to a second position at the top of the frame members to form a brace therebetween to assist in maintaining the frame members upright.

3. A portable receptacle according to claim 2 including releasable means maintaining said bar in the second position.

4. A portable receptacle according to claim 2 including releasable means comprising a resilient element lying in the path of the bar and engageable by the bar as the latter is moved to the second position to maintain it in that position.

5. A portable receptacle according to claim 2 including a carrying handle for the container, said container having an opening through which the handle is adapted to project from the container, and means mounting the handle on the bar so that the handle is movable into a retracted position relative to the bar to facilitate movement of the latter to the first position without obstruction of the handle by the walls of the container.

6. The portable receptacle comprising a collapsible container formed with a slot in a top wall and an end opening, a foldable frame for expanding the container removable through the end opening when collapsed, a retractable handle mounted on said frame for projecting through said slot when in an extended carrying position and for retracting through said slot within the container when removing the frame and handle as a unit from the container.

7. A portable receptacle as defined in claim 2 including a carrying handle for the container mounted on said bar, said container having an opening portion to receive the handle when the bar is in said second position.

ABRAHAM HALPIN.

REFERENCES CITED

The following references are of record in the file of this patent:

UNITED STATES PATENTS

| Number | Name | Date |
| --- | --- | --- |
| 440,061 | Reynolds | Nov. 4, 1890 |
| 880,347 | Allgire | Feb. 25, 1908 |
| 1,103,646 | Baddeley | July 14, 1914 |
| 1,177,068 | Vaughan | Mar. 28, 1916 |
| 1,268,124 | Jennings | June 4, 1918 |
| 1,343,195 | Chilton | June 15, 1920 |
| 1,495,752 | La Rue | May 27, 1924 |
| 1,869,071 | McLean | July 26, 1932 |
| 2,049,884 | Wurster et al. | Aug. 4, 1936 |
| 2,079,458 | Leichtfuss | May 4, 1937 |
| 2,133,590 | Stopper | Oct. 18, 1938 |
| 2,170,379 | Ortt | Aug. 22, 1939 |
| 2,189,920 | Mulnix | Feb. 13, 1940 |
| 2,332,999 | Garvey | Oct. 26, 1943 |

FOREIGN PATENTS

| Number | Country | Date |
| --- | --- | --- |
| 635 | Great Britain | of 1883 |
| 21,100 | Great Britain | of 1908 |